United States Patent Office 3,075,886
Patented Jan. 29, 1963

3,075,886
PURIFICATION OF ENZYMES
Theodore Cayle, Valley Stream, N.Y., assignor to Baxter Laboratories, Inc., Morton Grove, Ill., a corporation of Delaware
No Drawing. Filed Sept. 19, 1960, Ser. No. 56,697
7 Claims. (Cl. 195—66)

The present invention relates to a novel method of purifying enzymes. More particularly it relates to a novel method of isolating enzymes in a highly purified form from crude fermentation mixtures.

For the commercially practicable production of industrial enzymes by fermentation techniques, it is desirable to utilize relatively inexpensive substrates in the fermentation media. Brewer's yeast, corn steep liquor, cereal mash, bran, and the like, are representative of such substrates. Although these substrates are sufficiently inexpensive and nutritionally adequate to be acceptable for use in commercial fermentations, they are quite heterogeneous in composition and contain a variety of non-fermentable constituents. These non-fermentable constituents often interfere with the isolation of certain enzymes from crude fermentation broths. The problem has been particularly acute with the enzyme cellulase.

Previous efforts to isolate enzymes in a commercially acceptable form from fermentation mashes have for the most part been concerned with solvent fractionation procedures, and the like, which in addition to being expensive and time consuming, may result in a final product which is of a gummy texture and which has only limited enzyme activity. A relatively successful method of purifying enzymes, which is not dependent upon solvent fractionation procedures, is described by Wallerstein in U.S.P. 2,452,000. The Wallerstein method comprises forming an enzyme-lignin complex. This method, however, does not separate from the enzyme other protein and colloidal matter originally present, and also requires the separation of the lignin from the enzyme.

It is therefore an object of the present invention to provide a simple inexpensive process for the isolation of enzymes in a highly purified form from the complex nutritional substrates which best support microbial growth and consequent enzyme production.

It is a further object to provide a process by which the enzyme is so isolated and purified as to be obtained in a commercially desirable highly active form.

These and still other objects will become apparent as the specification proceeds.

It has now been discovered that enzymes may be obtained in a highly purified form from aqueous extracts of fermentation mixtures by the novel method which comprises the addition of a water soluble lignin, with concurrent adjustment of pH to the low alkaline range, so as to adsorb the impurities, then removing said lignin and adsorbed impurities to obtain a highly purified enzyme-containing solution. The solution thus obtained is then treated in such a manner as to obtain a dry free-flowing enzyme powder.

In the preferred practice of the present invention an enzyme-producing microorganism is inoculated into a nutrient fermentation medium which will support the growth of the microorganism as well as the industrially significant production of the enzyme. The fermentation is permitted to continue until the desired quantity of enzyme has been produced. Normally, this will be from 86 to 116 hours. The fermentation medium may be either a semi-solid mash or a liquid medium such as is employed in submerged fermentation procedures. If a semi-solid mash is employed the enzyme is extracted and solubilized by washing the medium with water. If submerged fermentation is used, the enzyme, of course, is already in solution.

Diatomaceous earth is added to the water extract and the mixture filtered to remove the water-insoluble components. The filtrate is then concentrated.

To the concentrate is added a sufficient amount of ammonium sulfate to precipitate the desired proteins along with certain undesirable components of the mixture. The mixture is then once more filtered. The resulting precipitate is dissolved in water, the pH adjusted so that the addition of the alkaline solution of water soluble lignin results in a mixture the final pH of which is between 7 and 8. The lignin, along with the adsorbed impurities, is then removed by filtration or centrifugation. To the thus obtained filtrate is added a sufficient amount of a material, in an aqueous solution of which the enzyme is both stable and insoluble, to precipitate the enzymes in a highly purified state. These enzymes are then removed and dried to form a free-flowing, highly active enzyme product.

The enzymes may be produced by microorganisms grown upon a wide variety of media. The most common substrates being wheat bran and similar solid plant material suspended in either trays, cabinets or in a rotating drum.

The word "lignin" stands for a class of substances which constitute that part of the wood not directly extractable by solvents like alcohol or benzine, and which is not converted into carbohydrates by hydrolysis with mineral acids.

The lignin that remains after the hydrolysis of the cellulose components in strong mineral acids is water insoluble. It may, however, be converted into water-soluble forms of lignin by chemical treatment, for example, by the treatment of lignin derived from the hydrolysis of wood with a mineral acid, such as nitric acid to form nitrolignin; by the digestion of lignin with bisulfite to convert it to lignosulfonic acid; and by cooking lignin with caustic soda to form "black liquor," which is in turn neutralized with acid to form "alkali cook" lignin (see for example, E. B. Brookbank, "Recovery and Uses of By-Product Soda Lignin," Chemurgic Digest, June 30, 1943). Illustrative of a commercially available water soluble lignin usable in the present invention is the product sold under the trademark PL-32 by West Virginia Paper and Pulp Company. The lignins described in the earlier referred to Wallerstein U.S. patent are, of course, also acceptable.

The amount of lignin contemplated for use in the present invention is, of course, dependent upon the specific enzyme containing extract to be treated, the amount of impurities present and the type of lignin employed. This amount is generally best determined by trial testing. It is found especially convenient in most instances to add the lignin as an aqueous alkaline solution to the extract. Such a lignin solution may be prepared, for example, by dispersing 30 grams of "alkali cook" lignin with stirring in 100 milliliters of water and 100 milliliters of 1.8% sodium hydroxide.

The water soluble lignin is preferably added to a solution with the pH so adjusted that the final pH of the mixture is in the range of 7 to 8.

The present invention is further illustrated by reference to the following examples in which all "parts" and "percentages" are expressed as "parts" and "percentages" by weight unless otherwise specified. To compare the results obtained by the isolation of enzymes from the concentrates, with and without the use of lignin, the following series of experiments were conducted:

EXAMPLE I

To 100 parts of wheat bran was added 60 parts of 0.2 N hydrochloric acid containing 0.62 p.p.m. of $ZnSO_4$, 0.62 p.p.m. of $FeSO_4$ and 0.88 p.p.m. $CuSO_4$. The mixture was sterilized with steam and after cooling inoculated with a sporulated inoculum of *Aspergillus niger*. The inoculated bran was maintained at a temperature of 30° C. by passing moist air through the mixture, until testing indicated the presence of substantial quantities of cellulase.

An aqueous extract was prepared by washing the mixture with four volumes of water. The extract was concentrated by evaporation to a specific gravity of 1.1.

46.5 grams of the above aqueous extract were treated with 23.25 gm. of solid $(NH_4)_2SO_4$ and the mixture filtered in the presence of diatomaceous earth. The precipitate was dispersed in an equal weight of water and the mixture filtered. To this filtrate, containing enzyme plus impurities, sufficient 91% isopropyl alcohol at 0° C. was added to adjust it to an isopropanol concentration of 65%. The precipitate that then formed was harvested by filtration, and allowed to dry in vacuo at room temperature. The resulting enzyme product was tacky and could not be powdered into a free-flowing form. The overall yield of enzyme also suffered greatly, as will be seen in Table I.

EXAMPLE II 100 gm. of the aqueous extract (specific gravity 1.1) described in Example I was treated with 50 gm. of solid $(NH_4)_2SO_4$. The mixture was then filtered in the presence of diatomaceous earth. The precipitate was dispersed in an equal weight of water and filtered again. After the filtrate was adjusted to a pH of 6.5 with NaOH, 6.7 ml. of an alkaline lignin solution 15% by weight, was added. The lignin solution was prepared by dispersing 30 gm. of "alkali cook" lignin in 100 ml. $H_2O$ and 100 ml. of 1.8% NaOH. After this addition the pH of the mixture was 7.3. The mixture was then stirred for 15–30 minutes. Diatomaceous earth was then added and the mixture filtered. To the thus obtained filtrate was added 91% isopropyl alcohol at 0° C. in sufficient quantity to adjust the final isopropanol concentration to 65% at which point the cellulase precipitated. The liquid was removed by filtration and evaporation to yield a dry, free-flowing, highly active cellulase powder.

The cellulase activity (CA) of the products obtained in Examples I and II was assayed by determining the amount of reducing sugars formed by the action of the enzyme on carboxymethylcellulose, at a pH of 6.0 and a temperature of 40° C. The values recorded in Table I are not absolute, but relative to one another, and are based on an arbitrarily chosen enzyme reference standard. It will be noted from the table that the lignin treatment dramatically increases the yield of the enzyme and its quality.

EXAMPLE III

An aqueous extract was prepared of the semisolid mash of Example I upon which *Aspergillus oryzae* growth had been maintained under optimum conditions for the production of cellulase. The extract was filtered and concentrated to a specific gravity of 1.1 and the procedure of Example II repeated. The results are recorded in Table II.

EXAMPLE IV

An aqueous extract was prepared of the semisolid mash of Example I upon which *Aspergillus niger* growth had been maintained under conditions for the production of polygalacturonase. The extract was filtered and concentrated to a specific gravity of 1.1.

Table III shows the results of the experiment. Polygalacturonase activity (PG) was determined by allowing the enzyme to hydrolyze a solution of Ehrlich's pectolic acid at a pH of 3.4 at 30° C. and titrating the free aldehyde groups. The PG unit refers to the rate of substrate hydrolysis, expressed as a monomolecular constant, by 1 gm. of enzyme.

EXAMPLE V

An aqueous extract was prepared by the semisolid mash of Example I upon which *Aspergillus oryzae* growth had been maintained under conditions for the production of alpha-amylase. The extract was filtered and concentrated to a specific gravity of 1.1 and the procedure of Example II repeated. A sixteen-fold purification, at a 56% yield, was obtained of a highly active, free-flowing enzyme preparation.

Table I
STARTING MATERIAL

|  | Weight, gram | CA | Total units |
|---|---|---|---|
| Ex. I (untreated) | 46.5 | 1,208 | 56,100 |
| Ex. II (lignin treated) | 100 | 1,125 | 112,500 |

FINAL PRODUCT

|  | Weight, gram | CA | Total units | Yield, percent | Purification | Appearance |
|---|---|---|---|---|---|---|
| Ex. I (untreated) | 0.672 | 22,000 | 14,750 | 26.3 | 18.2X | tacky. |
| Ex. II (lignin treated) | 2.53 | 40,000 | 101,300 | 90 | 35.6X | free-flowing. |

CA represents cellulose activity.

Table II
STARTING MATERIAL

|  | Weight, gram | CA | Total units |
|---|---|---|---|
| Ex. III | 100 | 45 | 4,500 |

FINAL PRODUCT

|  | Weight, gram | CA | Total units | Yield, percent | Purification |
|---|---|---|---|---|---|
| Ex. III | 3.5 | 750 | 2,630 | 58.4 | 16.7X |

CA represents cellulase activity.

Table III
STARTING MATERIAL

|  | Weight, gram | PG | Total units |
|---|---|---|---|
| Ex. IV | 100 | 890 | 89,000 |

FINAL PRODUCT

|  | Weight, gram | PG | Total units | Yield, percent | Purification |
|---|---|---|---|---|---|
| Ex. IV | 2.49 | 11,350 | 28,250 | 32 | 12.8X |

PG represents polygalacturonase.

While for purposes of illustration in the examples the enzymes have been precipitated from the aqueous solution containing them by use of isopropyl alcohol, the removal of the enzyme from the solution is obviously not so restricted. The wide variety of solvents may be used to precipitate the enzyme as well as other conventional techniques such as spray drying and the like. It is of course generally preferred to use a solvent which can be readily removed from the precipitate by evaporation such as the lower alkyl alcohols, acetone and the like.

It will be readily apparent to those skilled in the art that by exercise of the present invention it is possible to obtain useful, highly purified enzymes which were previously unobtainable. Such an enzyme, for example, is cellulase. Cellulase in a highly purified form may be employed in the hydrolysis of plants and plant products ingested by animals, the hydrolysis of plant products which are found in typical sewerage, the modification of cellulose derivatives used by the paper and textile industries, and the like.

Embodiments of the present invention in which an exclusive property or privilege is claimed are the following:

1. The method of purifying enzymes which comprises adding an alkaline solution of a water soluble lignin to a solution containing an enzyme selected from the class consisting of cellulase, polygalacturonase and alpha amylase and impurities, so that the final pH of the mixture is about 7 to 8, separating the lignin and adsorbed impurities from the solution and then finally removing the enzyme from the solution in a dry, highly purified, free-flowing form.

2. The method of claim 1, wherein the lignin and adsorbed impurities are separated from the solution by filtration.

3. The method of claim 1, wherein the lignin and adsorbed impurities are separated from the solution by centrifugation.

4. The method of claim 1 wherein the enzyme is removed from the solution in a dry free-flowing form by spray drying.

5. The method of claim 1 wherein the enzyme is obtained from the solution by evaporation of the solvent.

6. The method of purifying enzymes which comprises preparing an aqueous extract containing an enzyme selected from the class consisting of cellulase, polygalacturonase and alpha amylase, adjusting the extract to an appropriate pH so that the addition of an alkaline solution of a water soluble lignin to adsorb impurities present results in a final pH of about 7 to 8, separating the lignin and adsorbed impurities from the extract, precipitating the enzyme from the extract, collecting and drying the precipitate to obtain a dry, highly purified enzyme product.

7. The method of claim 6 in which the enzyme is cellulase.

References Cited in the file of this patent
UNITED STATES PATENTS 2,452,000     Wallerstein et al. _____ Oct. 19, 1948

OTHER REFERENCES

The Enzymes, Sumner et al., 1951, Academic Press, N.Y., vol. 2, pp. 728–731.

Walseth: TAPPI, vol. 35, pp. 228 to 237 (1952), TS 1080 T3.

Seo: A Study of Cellulase Production by Certain Fungi, University of Syracuse, 1959, L.C. Card No. Mic 59–2673, abstracted in Dissertation Abstracts, vol. 20, page 460.